N. S. NOYES.
Potato-Digger.
No. 68,309.
Patented Aug. 27, 1867.
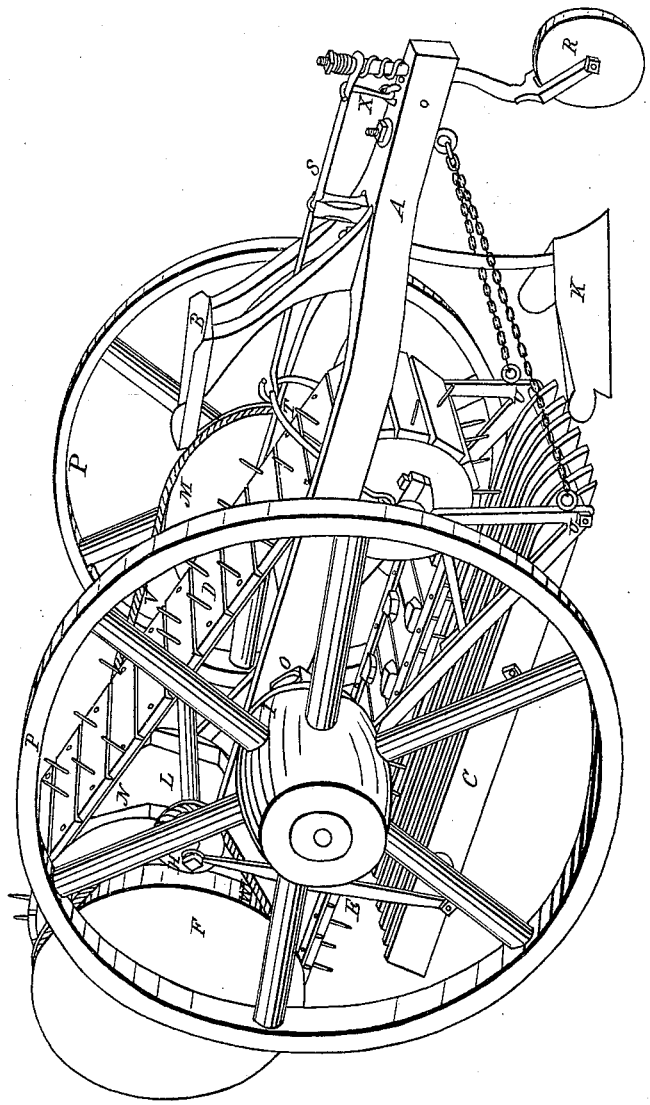
Witnesses:
Geo. A. Starkweather
N. P. Chandler
Inventor:
Nathan S Noyes

United States Patent Office.

NATHAN S. NOYES, OF PLYMOUTH, MICHIGAN.

*Letters Patent No. 68,309, dated August 27, 1867.*

IMPROVEMENT IN POTATO-DIGGER.

The Schedule referred to in these Letters Patent and making part of the same.

TO ALL WHOM IT MAY CONCERN:

Be it known that I, NATHAN S. NOYES, of Plymouth, in the county of Wayne, in the State of Michigan, have invented an Improvement in Potato-Diggers; and I do declare that the following is a true and accurate description thereof, reference being had to the accompanying drawings, and to the letters of reference marked thereon, and being a part of this specification.

The carriage of this apparatus consists of a frame, A, set upon a proper axle, and wheels, P P. R is a small guiding-wheel, attached by a rod and spiral springs to the frame, and acts upon the lever S and bail T in raising and lowering the front of the apparatus. X is a hook attached to the frame A, which, when hooked on to the lever S, holds the front of the apparatus clear of the ground. C is a grating whose points are sharpened, suspended by the frame U. The points of this grating are intended to pass under the hill of potatoes and take it up, when the potatoes are raked to the rear end of the apparatus by the rake-teeth on the endless apron D. These rake-teeth are placed upon the endless belt in such shape as constantly to draw the potatoes to the centre of the grating C, while the dirt falls through the interstices in the grating. By means of the connecting-rod E, worked by the eccentric wheel H, attached to the shaft L, the grating C has a perpendicular motion which causes the dirt to drop through to the ground. Upon the opposite end of the shaft L is another connecting-rod, worked by a similar eccentric wheel, to sustain and give motion, the same as is given by E and H. M is a wheel attached to the axle, which gives motion by means of the belt V to the drum N, around which revolves the endless belt D. The drum N is made octagonal in form, to prevent the endless belt D from slipping. F is a pulley attached to the shaft upon which the drum N is placed, to give motion to the eccentric wheel H by means of the belt W. K is a double mould-board plough, sharp at its lower edges, to cut off the tops of the vines. I is a collar fitted to the inner end of each of the hubs of the wheels P P, and held in place by the spring O. The inner sides of this collar are provided with projections which fit into corresponding indentations in the hub, and allow the wheels to be turned backwards, or the digger to be turned around without deranging the apparatus in any way.

Having thus described the construction and arrangement of my invention, the practical operation of the same is as follows: The machine is placed over the row of potatoes so that the wheels P P shall be on each side of it. As the machine moves forward the plough K cuts off the tops or vines, and the teeth of the grating C are forced under the hill, when the potatoes are caught by the rake-teeth upon the endless belt D and drawn over the grating, while the dirt is dropped through to the ground. In backing or turning round there is no possibility of deranging any part of the mechanism of the digger.

What I claim as my invention, and desire to secure by Letters Patent, is—

1. The perpendicular motion given to the grating C, for the purpose described.

2. The combination and arrangement of the frame A, seat B, grating C, endless belt D, connecting-rod E, pulley F, eccentric wheel H, plough K, collar I, shaft L, driving-wheel M, drum N, spring O, wheels P P, wheel R, lever S, bail T, frame U, belts V W, arranged substantially as described for the purpose designed.

NATHAN S. NOYES.

Witnesses:
GEO. A. STARKWEATHER,
N. P. CHANDLER.